United States Patent
Wu et al.

(10) Patent No.: US 9,540,550 B2
(45) Date of Patent: Jan. 10, 2017

(54) ADHESIVE COMPOSITION AND ADHESIVE TAPE

(71) Applicant: 3M INNOVATIVE PROPERTIES COMPANY, St. Paul, MN (US)

(72) Inventors: Qing Wu, Shanghai (CN); Zhou Li, Shanghai (CN); Liang Qin, Shanghai (CN); Fanwang Kong, Shanghai (CN); Hongmei Wan, Shanghai (CN)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/431,815

(22) PCT Filed: Sep. 29, 2012

(86) PCT No.: PCT/CN2012/082466
§ 371 (c)(1),
(2) Date: Mar. 27, 2015

(87) PCT Pub. No.: WO2014/047932
PCT Pub. Date: Apr. 3, 2014

(65) Prior Publication Data
US 2015/0232718 A1    Aug. 20, 2015

(51) Int. Cl.
| | |
|---|---|
| C08F 2/50 | (2006.01) |
| C08F 2/46 | (2006.01) |
| C08G 61/04 | (2006.01) |
| B32B 9/00 | (2006.01) |
| C09J 163/00 | (2006.01) |
| C09J 7/02 | (2006.01) |

(52) U.S. Cl.
CPC ............. *C09J 163/00* (2013.01); *C09J 7/0207* (2013.01); *Y10T 428/1476* (2015.01); *Y10T 428/287* (2015.01)

(58) Field of Classification Search
CPC ...... C09J 163/00; C09J 7/207; Y10T 428/287; Y10T 428/1476
USPC   522/31, 6, 1, 71, 189, 184; 520/1; 428/41.8
See application file for complete search history.

(56) References Cited

U.S. PATENT DOCUMENTS

| | | | | |
|---|---|---|---|---|
| 4,256,828 A | * | 3/1981 | Smith .................... | C08G 59/62 430/270.1 |
| 6,274,643 B1 | | 8/2001 | Karim et al. | |
| 6,309,502 B1 | | 10/2001 | Hiroshige | |
| 7,744,803 B2 | * | 6/2010 | Jackson .................. | C08J 3/243 264/477 |
| 2002/0182955 A1 | | 12/2002 | Weglewski | |
| 2004/0094264 A1 | | 5/2004 | Yamaguchi | |
| 2004/0159391 A1 | | 8/2004 | Yamaguchi | |
| 2005/0245643 A1 | | 11/2005 | Gan et al. | |
| 2010/0190899 A1 | | 7/2010 | Mori et al. | |
| 2011/0210407 A1 | | 9/2011 | Katayama et al. | |

FOREIGN PATENT DOCUMENTS

| | | | |
|---|---|---|---|
| CN | 1267317 | | 9/2000 |
| CN | 1505672 | | 6/2004 |
| CN | 1516727 | * | 7/2004 |
| CN | 101798439 | | 8/2010 |
| DE | 2007/100329 A1 | | 9/2007 |
| EP | 0620259 | | 10/1994 |
| JP | 09-291267 A2 | | 11/1997 |
| JP | 2000-109757 A2 | | 4/2000 |
| JP | 2000/281997 A2 | | 10/2000 |
| JP | 2005-144745 | | 6/2005 |
| JP | 2008-214449 | | 9/2008 |
| JP | 2009-010296 A2 | | 1/2009 |
| RU | 2276169 C1 | | 5/2006 |
| WO | 97-21229 | * | 6/1997 |
| WO | WO 97-21229 | | 6/1997 |
| WO | WO 2013-000161 | | 1/2013 |

OTHER PUBLICATIONS

Bayer et al, WO 1997-021229 Machine translation, Jun. 12, 1997.*
Kitamura et al, CN 1516727 Machine translation, Jul. 28, 2004.*
European Search Report for EP Application No. EP 12885253, dated Apr. 26, 2016, 2pgs.
International Search Report for PCT International Application No. PCT/CN2012/082466, mailed on Jul. 4, 2013, 5pgs.
Search Report for RU Appl. No. 2015112345, dated Jun. 6, 2016, 2 pp.
Search Report for JP Appl. No. 2015-533403, dated Jun. 21, 2016, 2 pp.

\* cited by examiner

*Primary Examiner* — Ling Choi
*Assistant Examiner* — Jessica E Whiteley
(74) *Attorney, Agent, or Firm* — Janet A. Kling; Gregg H. Rosenblatt

(57) ABSTRACT

The present invention provides a thermally conductive adhesive composition, based on the total weight of the composition, comprising: (a) 5-70% by weight of an epoxy component; (b) 5-60% by weight of thermally conductive material; (c) 0.001-10% by weight of a photoinitiator; (d) 0-40% by weight of a thermoplastic polymer; (e) 0-50% by weight of a hydroxyl-functional component; and (f) 0-50% by weight of a halogen-free flame retardant. The present invention further provides a thermally conductive adhesive tape comprising the adhesive composition.

12 Claims, 1 Drawing Sheet

ADHESIVE COMPOSITION AND ADHESIVE TAPE

TECHNICAL FIELD

The present invention relates to an adhesive composition and an adhesive tape. Specifically, the present invention relates to a thermally conductive pressure-sensitive adhesive composition, and a thermally conductive pressure-sensitive adhesive tape with excellent bond strength and high thermal conductivity.

BACKGROUND

The rapid developments in electronic product and commodity industry bring about huge demands for user-friendly interface bonding materials. As a conventional method in the art, a thermal interface material has to be used with mechanical bonding together so as to bond components in electric and electronic products. Specifically, holes need to be drilled in chips and radiators. In addition, screws, gaskets, screw caps as well as thermal grease are needed, and they are connected by a very complicated, high cost and time-consuming approach.

There is a need for a user-friendly interface adhesive tape to replace mechanical bolts used in the conventional method to bond two components in electric and electronic products. The bond strength of the tape is very important for achieving a long-term stable fixation of the components in the product. To be used in electric and electronic products, the tape should also provide efficient heat dissipation.

Therefore, there is a need for an adhesive tape providing excellent bond strength and high thermal conductivity, which can be conveniently used to bond components in electric and electronic products, so as to offer a "one-stop and easy solution" to the customers.

SUMMARY

The present application provides a thermally conductive pressure-sensitive adhesive tape which can be used to bond components in electric and electronic products in a simple, effective and low cost way without using any mechanical attachment means, and can simultaneously provide a balanced combination of high bond strength and high thermal conductivity, as well as halogen-free flame retardant property and high electrical insulation property, if necessary. The present application further provides a thermally conductive pressure-sensitive adhesive composition useful for preparing the thermally conductive pressure-sensitive adhesive tape.

One embodiment provides a thermally conductive pressure-sensitive adhesive composition, based on the total weight of the composition, comprising:
(a) 5-70% by weight of an epoxy component;
(b) 5-60% by weight of thermally conductive material;
(c) 0.001-10% by weight of a photoinitiator;
(d) 0-40% by weight of a thermoplastic polymer;
(e) 0-50% by weight of a hydroxyl-functional component; and
(f) 0-50% by weight of a halogen-free flame retardant.

Another embodiment provides a thermally conductive pressure-sensitive adhesive tape, comprising:
(i) a backing layer; and
(ii) a thermally conductive pressure-sensitive adhesive layer provided on at least one side of the backing layer, based on the total weight of the adhesive layer, comprising:
(a) 5-70% by weight of an epoxy component;
(b) 5-60% by weight of thermally conductive material;
(c) 0.001-10% by weight of a photoinitiator;
(d) 0-40% by weight of a thermoplastic polymer;
(e) 0-50% by weight of a hydroxyl-functional component; and
(f) 0-50% by weight of a halogen-free flame retardant.

The above and other features and advantages of the present invention will become apparent from the following detailed description of embodiments and the appended claims.

BRIEF DESCRIPTION OF THE DRAWINGS

The present invention is further described with reference to the accompanying figures, wherein.

DETAILED DESCRIPTION

Figure 1:
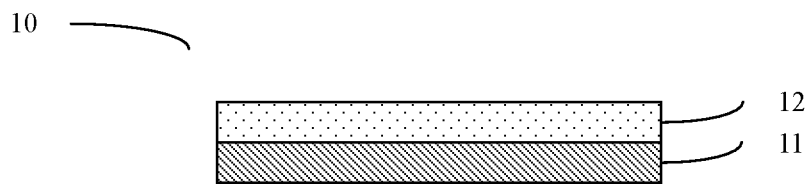
FIG. 1 is a cross-sectional view of an adhesive film tape in one embodiment.

The thermally conductive pressure-sensitive adhesive tapes according to some embodiments of the present invention have excellent adhesion strength, high thermal conductivity, and halogen-free flame retardant property, which can be advantageously applied to various adherends, for example electric and electronic products. In some embodiments, the thermally conductive pressure-sensitive adhesive tape of the present invention, when applied to an electric and electronic product, can be sufficiently bonded without using any mechanical attachment means. In some embodiments, the thermally conductive pressure-sensitive adhesive tape of the present invention can simultaneously provide an excellent bond strength (in terms of torque force of 6 kgf·cm or more), a high thermal conductivity (0.6 W/m·k or more), and a halogen-free flame retardant property (NHFR) (UL94-V0 rating).

In one embodiment, a thermally conductive adhesive composition is provided, which, based on the total weight of the composition, comprises:
(a) 5-70% by weight of an epoxy component;
(b) 5-60% by weight of thermally conductive material;
(c) 0.001-10% by weight of a photoinitiator;
(d) 0-40% by weight of a thermoplastic polymer;
(e) 0-50% by weight of a hydroxyl-functional component; and
(f) 0-50% by weight of a halogen-free flame retardant.

In another embodiment, a thermally conductive adhesive composition is provided, which, based on the total weight of the composition, comprises:
(a) 5-60% by weight of an epoxy component;
(b) 10-50% by weight of thermally conductive material;
(c) 0.1-8% by weight of a photoinitiator;
(d) 1-40% by weight of a thermoplastic polymer;
(e) 0-20% by weight of a hydroxyl-functional component; and
(f) 0-40% by weight of a halogen-free flame retardant.

In yet another embodiment, a thermally conductive adhesive composition is provided, which, based on the total weight of the composition, comprises:
(a) 10-50% by weight of an epoxy component;
(b) 15-40% by weight of thermally conductive material;
(c) 0.1-6% by weight of a photoinitiator;

(d) 2-30% by weight of a thermoplastic polymer;
(e) 0-10% by weight of a hydroxyl-functional component; and
(f) 0-30% by weight of a halogen-free flame retardant.

In yet another embodiment, a thermally conductive adhesive composition is provided, which, based on the total weight of the composition, comprises:
(a) 15-45% by weight of an epoxy component;
(b) 20-40% by weight of thermally conductive material;
(c) 0.5-4% by weight of a photoinitiator;
(d) 5-25% by weight of a thermoplastic polymer;
(e) 1-5% by weight of a hydroxyl-functional component; and
(f) 1-25% by weight of a halogen-free flame retardant.

Another embodiment of the present invention provides a thermally conductive pressure-sensitive adhesive tape, comprising:
(i) a backing layer, and
(ii) a thermally conductive pressure-sensitive adhesive layer comprising the thermally conductive adhesive composition provided above in any one embodiment of the present invention and provided on at least one side of the backing layer.

A variety of materials may be used in the thermally conductive pressure-sensitive adhesive composition and the thermally conductive pressure-sensitive adhesive tape of the present invention. Given below is a description of materials suitable for use in the present invention.

All parts, percentages, concentrations, etc. used herein are based on weight, unless specified otherwise.

All amounts of components are based on the total weight of the composition or adhesive layer in the tape, unless specified otherwise.

A. Epoxy Component

The epoxy component herein comprises one or more epoxy resins and/or monomers, and is used to form the adhesive structural construction.

Epoxy resins useful in the present invention may be any organic compound having at least one oxirane ring, that is polymerizable by a ring opening reaction. Such materials, also known as epoxides, include both monomeric and polymeric epoxides and may be, for example, aliphatic, alicyclic, heterocyclic, cycloaliphatic, or aromatic and may further be combinations thereof. A liquid epoxy resin with low Tg is preferably used so as to provide the adhesive composition with good tackiness and adhesion at room temperature. Namely, epoxy resin with Tg lower than room temperature is preferably selected for the invention. The polymeric epoxides include, but are not limited to, linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The weight-average molecular weight of the epoxy resin may vary from about 100 to about 5000, preferably in the range of about 300 to about 4000, and most preferably in the range of about 500 to about 3000.

The epoxy component used in the present invention desirably comprises one or more epoxy resins having an epoxy equivalent weight of from about 80 g/eq to about 1000 g/eq, more desirably from about 100 g/eq to about 800 g/eq, and even more desirably from about 100 g/eq to about 400 g/eq. In one embodiment, the epoxy component in the present invention comprises two or more epoxy resins with different epoxy equivalent weights.

Suitable epoxy resins for use in the present invention include, but are not limited to, aromatic epoxy compounds, alicyclic epoxy compounds, and aliphatic epoxy compounds.

The aromatic epoxy compounds include glycidyl ethers of polyhydric phenols, for example, hydroquinone, resorcinol, bisphenol A, bisphenol F, 4,4'-dihydroxybiphenyl, novolak, and tetrabromobisphenol A.

The alicyclic epoxy compounds include polyglycidyl ethers of polyhydric alcohols having at least one alicyclic ring and cyclohexene oxide- or cyclopentene oxide-containing compounds obtained by epoxidizing cyclohexene ring- or cyclopentene ring-containing compounds with an oxidizing agent.

Specific examples are hydrogenated bisphenol A diglycidyl ether, such as (3,4-epoxycyclohexyl)methyl 3,4-epoxy-cyclohexylcarboxylate, 3,4-epoxy-1-methylcyclohexyl 3,4-epoxy-1-methylhexanecarboxylate, (6-methyl-3,4-epoxycyclohexyl)methyl 6-methyl-3,4-epoxycyclohexanecarboxylate, (3,4-epoxy-3-methylcyclohexyl)methyl 3,4-epoxy-3-methylcyclohexanecarboxylate, (3,4-epoxy-5-methylcyclohexyl)methyl 3,4-epoxy-5-methylcyclohexanecarboxylate, bis(3,4-epoxycyclohexylmethyl) adipate, methylenebis(3,4-epoxycyclohexane), 2,2-bis(3,4-epoxycyclohexyl)propane, dicyclopentadiene diepoxide, ethylenebis(3,4-epoxycyclohexanecarboxylate), dioctyl epoxyhexahydrophthalate, and di-2-ethylhexyl epoxyhexahydrophthalate.

The aliphatic epoxy compounds include polyglycidyl ethers of aliphatic polyhydric alcohols or allylene oxide adducts thereof; polyglycidyl esters of aliphatic long-chain polybasic acids; homopolymers synthesized by vinyl polymerization of glycidyl acrylate or glycidyl methacrylate; and copolymers synthesized by vinyl polymerization of glycidyl acrylate or glycidyl methacrylate and other vinyl monomers. Typical examples include glycidyl ethers of polyhydric alcohols, such as 1,4-butanediol diglycidyl ether, 1,6-hexanediol diglycidyl ether, glycerol triglycidyl ether, trimethylolpropane triglycidyl ether, sorbitol tetraglycidyl ether, dipentaerythritol hexaglycidyl ether, polyethylene glycol diglycidyl ether, and polypropylene glycol diglycidyl ether; polyether polyol polyglycidyl ethers obtained by adding one or more alkylene oxides to aliphatic polyhydric alcohols, such as propylene glycol, trimethylolpropane, and glycerol; and diglycidyl esters of aliphatic long-chain dibasic acids. Also included are monoglycidyl ethers of aliphatic higher alcohols, monoglycidyl ethers of phenol, cresol, butyl phenol or a polyether alcohol thereof obtained by addition of an alkylene oxide, glycidyl esters of higher fatty acids, epoxidized soybean oil, octyl epoxystearate, butyl epoxystearate, and epoxidized polybutadiene.

The epoxy component of the present invention comprises one or more epoxy resins selected from the above-described polyepoxy compounds.

A number of commercially available epoxy resins may be used in the present invention. Epoxides, which are readily available, include, but are not limited to, such as, diphenol propane epoxy resin 618/0164E, 163, available from Blue Star Materials Company, China, diphenol propane expoxy resin CYD128, available from Baling Petrochemical Corp., China, and 850, commercially available from DIC company, China; phenolic epoxy resin F44, F48, F51, commercially available from Blue Star Materials company, China.

The epoxy component used in the present invention may comprise one or more epoxy resins in an amount, which varies depending on the desired properties of the adhesive composition or tape. Desirably, the epoxy component is present in an amount of up to about 70 weight percent, more preferably up to about 60 weight percent, even more preferably up to about 50 weight percent, and most preferably up to about 45 weight percent, based on the total weight of the adhesive composition or adhesive layer of the adhesive tape. More desirably, the epoxy component is present in an amount of higher than about 5 weight percent, more preferably higher than about 10 weight percent, even more preferably higher than about 15 weight percent, based on the total weight of the adhesive composition or adhesive layer of the adhesive tape. Even more desirably, the epoxy component is present in an amount from about 5 weight percent to about 70 weight percent, preferably from about 5 weight percent to about 60 weight percent, even more preferably from about 10 weight percent to about 50 weight percent, and most preferably from about 15 weight percent to about 45 weight percent, based on the total weight of the adhesive composition or adhesive layer of the adhesive tape.

In one embodiment, YD128 commercially available from Kukdo Chemical (Kunshan) Co. Ltd., China is used. YD128 has an epoxy equivalent weight of ca. 187, and is liquid at room temperature and atmospheric pressure.

B. Thermally Conductive Material

The composition of the present invention comprises thermally conductive materials, such as thermally conductive fillers. Electrically insulating, thermally conductive filler is preferably used to get high electrically insulating properties in addition to the thermally conductive properties. Suitable materials include, but are not limited to, ceramics, metal oxides, metal nitrides, and metal hydroxides, for example, $Al(OH)_3$, BN, SiC, AlN, $Al_2O_3$, $Si_3N_4$, and the like. The thermally conductive material preferably has a thermal conductivity of 100 W/m·k or more. These materials may be used alone, or in combination of two or more thereof. The amount of the thermally conductive material is in the range of about 5-60 wt %, preferably about 10-50 wt %, even more preferably about 15-40 wt %, and most preferably about 20-40 wt %, based on 100 wt % of the total weight of the composition or the adhesive layer, in view of a balance between a desired heat conductivity and suitable cohesion of the adhesion composition. Fillers with different particle sizes may be used simultaneously in combination. The preferred mean particle size is in the range of about 0.01-50 µm, depending on the thickness of the layer. The invented adhesive or tape can be made as a product with a thickness from 10~500 µm, preferably 30~300 µm for pressure sensitive adhesive bonding application. Thermally conductive filler size will be equal to or less than the thickness of the dry adhesive layer that is single coated or attached or positioned via any technical means on the backing layer.

For improved cohesion of a layer, thermally conductive filler which has been surface-treated with silane, titanate or the like may be used. Examples of suitable thermally conductive fillers include, but are not limited to, boron nitride (BN) and aluminium trihydrate (ATH). In some embodiments, BN fillers with different particle sizes are preferably used. Examples of commercially available thermally conductive fillers suitable for the present invention include, but not limited to, boron nitride fillers CF200, CF100, and CF300, commercially available from Yingkou Pengda Chemical Material Company, China, or Momentive Company, China.

For example, a thermally conductive material comprising BN powder, CF200, with mean particle size of 8-15 µm, size distribution: 4.45 µm, <25% wt, 7.3 µm<50% wt, 10.5 µm<75% wt, 13.4 µm<90% wt, surface area of 3-5 $m^2$/g, tap density of 0.35 g/cc, from Yingkou Pengda Chemical Material Company, China is used.

In another embodiment, a thermally conductive material comprising metal hydrate, for example aluminium hydroxide (ATH), with mean particle size of 5-10 µm; D10/D90: 1/15 µm, from Suzhou Ruifeng Material Company, China is used.

A preferable material used in some embodiments of the present invention is aluminum hydrate.

C. Photoinitiator

The present adhesive composition or tape also comprises an effective amount of a photoinitiator component as a curing agent for crosslinking the pressure-sensitive adhesive. Photoinitiators for use in the present invention are desirably activated by photochemical means, such as by actinic radiation (i.e., radiation having a wavelength in the ultraviolet or visible portion of the electromagnetic spectrum) or e-beam. Compared with initiation by heat, photoinitiation is much more efficient in view of energy consumption.

Based on the total weight of the composition or adhesive layer, the photoinitiator is present in an amount of about 0.001-10% by weight, preferable about 0.1-8% by weight, even more preferably about 0.1-6% by weight, and most preferably about 0.5-4% by weight. The amount of the photoinitiator used herein may depend on the light source and the degree of exposure. Desirably, one or more photoinitiators may be present in an amount of up to about 10 weight percent, based on the total weight of the composition. More desirably, one or more photoinitiators may be present in an amount of up to about 8 weight percent, based on the total weight of the composition. Even more desirably, one or more photoinitiators may be present in an amount of up to about 6 weight percent, based on the total weight of the composition. Even more desirably, one or more photoinitiators may be present in an amount of up to about 4 weight percent, based on the total weight of the composition. Desirably, one or more photoinitiators may be present in an amount of more than about 0.001 weight percent, based on the total weight of the composition. More desirably, one or more photoinitiators may be present in an amount of more than about 0.1 weight percent, based on the total weight of the composition. Even more desirably, one or more photoinitiators may be present in an amount of more than about 0.5 weight percent, based on the total weight of the composition. In one embodiment, one or more photoinitiators may be present in an amount of from about 0.001 weight percent to about 10 weight percent, based on the total weight of the composition. In another embodiment, one or more photoinitiators may be present in an amount of from about 0.1 weight percent to about 8 weight percent, based on the total weight of the composition. In yet another embodiment, one or more photoinitiators may be present in an amount of from about 0.1 weight percent to about 6 weight percent, based on the total weight of the composition. In yet another embodiment, one or more photoinitiators may be present in an amount of from about 0.5 weight percent to about 4 weight percent, based on the total weight of the composition.

The photoinitiator used in the invention may be any suitable photoinitiator, such as a radical photoinitiator or a cationic photoinitiator. Specifically, different photoinitiators could be used in combination, for example, a radical photoinitiator can be used with a cationic photoinitiator together. Examples of photoinitiator may include photoinitiators including α-amino ketones group, photoinitiators including benzyl ketals group, photoinitiators including benzophenones group, or aryl iodonium salts type photoinitiators, aryl sulfonium salts type photoinitiators, alkyl sulfonium salts type photoinitiators, iron aromatic salt type compounds, acylation sulfonylurea oxygen radical ketones, etc., or a mixture thereof. Preferably, onium salt type photoinitiators, such as iodonium and sulfonium complex salts, are used. The photoinitiator may have a melt point above 70° C. The photoinitiator with higher melt point is preferably used in view of obtaining higher temperature resistance for invented products. Different photoinitiators may be added separately or simultaneously as a mixture to the composition.

Suitable commercially available photoinitiators include, but are not limited to, TPO (2,4,6-trimethylbenzoyldiphenylphosphine oxide), available from Shanghai H&C Fine Chemical Co. Ltd., China, 1107 (2-methyl-1-(4-methylthio)phenyl-2-morpholinopropan-1-one), available from Guangzhou Topwork Chemical Company, China; 184 (1-Hydroxycyclohexyl-phenyl-ketone), available from Shanghai H&C Fine Chemical Co., Ltd, China, 1105, 2-isopropyl thioxanthone (a mixture with 4-isomer) and DETX, 2,4-diethyl thioxanthone, available from Shanghai H&C Fine Chemical Co. Ltd., China.

Cationic photoinitiator 1190, is used in at least one embodiment of the present invention. 1190 is a new mixture of triarylsulfonium hexafluorophosphate salts, composing of bis(4-(diphenylsulfonio)phenyl)sulfide bis(hexafluorophosphate) and diphenyl(4-phenylthio)phenylsufonium hexafluorophosphate, for cationic curing of epoxy, oxetane, and vinyl ether formulations, commercially available from IGM Resins, China.

D. Thermoplastic Polymer

The adhesive composition and tape of the present invention may comprise a thermoplastic polymer to aid the coating process and the formation of adhesive film. The thermoplastic polymer should have good compatibility with epoxy resin used in the invented composition. The thermoplastic polymer used herein preferably has a mooney viscosity at 100° C. in a range of 10~100, preferably 10~70, so as to ensure good property and proper molecular weight that are needed in the coating process and the formation of the adhesive film. If the molecular weight of the thermoplastic polymer is too low, the polymer does not have a suitable cohesion to form a coating film. On the other hand, if the molecular weight of the thermoplastic polymer is too high, it is not easy to dissolve the polymer in solvents for the coating process.

Thermoplastic polymers suitable for use in the present invention are not specifically limited, and thermoplastic polymer resin normally used as an adhesive in the conventional art may be used without limitations. Examples of thermoplastic polymers suitable for the present invention include, but are not limited to, ethylene vinyl acetate copolymers, acrylic polymer resins, epoxy modified acrylic polymer resins, and the like.

Preferably, an ethylene vinyl acetate copolymer component comprising one or more ethylene vinyl acetate copolymers can be used. The vinyl acetate content in the copolymer may vary from about 1 to about 99 wt %, preferably from about 20 to about 90 wt %.

Acrylic polymers suitable for use in the present invention are not specifically limited, and any acrylic polymer resin used as an adhesive in the conventional art may be used without limitations. The base polymer used in the adhesive composition can be obtained either by polymerization before being used into the present invention, or by the UV polymerization process during the process of mixing with other materials.

Preferred examples of the acrylic polymer resin include polymers formed by copolymerization of a (meth)acrylic ester monomer having an alkyl group of 1-12 carbon atoms with a polar monomer suitable for copolymerization with the (meth)acrylic ester monomer.

Examples of the (meth)acrylic ester monomer having an alkyl group of 1-12 carbon atoms include, but are not limited to, butyl (meth)acrylate, hexyl (meth)acrylate, n-octyl (meth)acrylate, isooctyl (meth)acrylate, 2-ethylhexyl (meth)acrylate or isononyl (meth)acrylate.

Examples of the polar monomer copolymerizable with the (meth)acrylic ester monomer include, but are not limited to, carboxyl group-containing monomers, such as (meth)acrylate acid, maleic acid and fumaric acid, or nitrogen-containing monomers, such as N-vinyl pyrrolidone and acrylamide, etc. These polar monomers can act to provide cohesion property to the adhesive and to improve adhesion strength.

The content of the polar monomer to the (meth)acrylic ester monomer is not specifically limited and the amount of the polar monomer is preferably about 1-20 wt % based on the total weight of all monomers.

The molecular weight of the acrylic polymer is also not specifically limited. Acrylic polymer with IV (inherent viscosity) >0.8 and preferably >1.0 and with glass transition temperature of about −30° or lower is preferably used in the present invention.

Specific examples of acrylic polymer suitable for use in the present invention are those available under the trade designations M017, SM30, M029 and M027, commercially available from Eternal Chemical Company in China. The content of the acrylic base polymer in total composition is about 15 to 60 weight %, more preferably about 20 to 50 weight %, based on 100 wt % of the total weight of the composition.

One example of ethylene vinyl acetate copolymer (EVA) is LEVAPREN 800 HV, available from Lanxess Company, Germany which has a vinyl acetate content of 80% wt., and a Mooney viscosity at 100° C. of 28.

Based on the total weight of the composition or adhesive layer, the thermoplastic polymer may be present in an amount of about 0-40% wt, more preferable about 0-30% wt, and most preferably about 0-20% wt. The amount of the thermoplastic polymer used herein may influence the film formation of the composition. Desirably, the thermoplastic polymer may be present in an amount of up to about 40 weight percent, based on the total weight of the composition. More desirably, the thermoplastic polymer may be present in an amount of up to about 30 weight percent, based on the total weight of the composition. Even more desirably, the thermoplastic polymer may be present in an amount of up to about 25 weight percent, based on the total weight of the composition. Most desirably, the thermoplastic polymer may be present in an amount of up to about 20 weight percent, based on the total weight of the composition. Desirably, the thermoplastic polymer may be present in an amount of more than about 1 weight percent, based on the total weight of the composition. More desirably, the thermoplastic polymer may be present in an amount of more than about 2 weight percent, based on the total weight of the composition. Even more desirably, the thermoplastic polymer may be present in an amount of more than about 5 weight percent, based on the total weight of the composition. In one embodiment, the thermoplastic polymer is present in an amount of from about 0 weight percent to about 40 weight percent, based on the total weight of the composition. In another embodiment, the thermoplastic polymer is present in an amount of from about 1 weight percent to about 40 weight percent, based on the total weight of the composition. In yet another embodiment, the thermoplastic polymer is present in an amount of from about 2 weight percent to about 30 weight percent, based on the total weight of the composition. In still yet another embodiment, the thermoplastic polymer is present in an amount of from about 5 weight percent to about 25 weight percent, based on the total weight of the composition.

E. Hydroxyl-Functional Component

The composition may further comprise 0-50% by weight of a hydroxyl-functional component, such as a polyol. The hydroxyl-functional component may promote the effect of the photoinitiator. The reaction may proceed more efficiently, even without further exposure to light.

The polyols suitable to be used in the present invention are not specifically limited, and may comprise one or more hydroxyl-containing compounds having a hydroxyl functionality of at least about 1. Commercially available examples of polyols include DL-400, DL-1000D, DL-2000D, EP-330N, POP-36, and POP-28, available from Shandong Blue Star company, China, and all of these polyols are also available from Shanghai Xiangkang Chemical Company, China.

By using the polyol, tri-functional prepolymers which offer superior cure characteristics can be prepared. The resulting system can be either a one-package (moisture cure) or a two-package (catalyzed) system.

In one embodiment, VORANOL 2070 polyol, available from DOW Chemical, USA, which is a polyether triol with a medium reactivity having a molecular weight of 700, is used.

Based on the total weight of the composition or adhesive layer, the hydroxyl-functional component may be present in an amount of about 0-50% by weight, preferable about 0-40% wt, more preferable about 0-20% wt, even more preferably 0-10% wt, further preferably about 0.5-8% wt, and most preferably about 1-5% wt. Desirably, the hydroxyl-functional component may be present in an amount of up to about 50 weight percent, based on the total weight of the composition. More desirably, the hydroxyl-functional component may be present in an amount of up to about 20 weight percent, based on the total weight of the composition. Even more desirably, the hydroxyl-functional component may be present in an amount of up to about 10 weight percent, based on the total weight of the composition. Further desirably, the hydroxyl-functional component may be present in an amount of up to about 8 weight percent, based on the total weight of the composition. Most desirably, the hydroxyl-functional component may be present in an amount of up to about 5 weight percent, based on the total weight of the composition. Desirably, the hydroxyl-functional component may be present in an amount of more than about 0.1 weight percent, based on the total weight of the composition. More desirably, the hydroxyl-functional component may be present in an amount of more than about 0.5 weight percent, based on the total weight of the composition. Even more desirably, the hydroxyl-functional component may be present in an amount of more than about 1 weight percent, based on the total weight of the composition. Further desirably, the hydroxyl-functional component may be present in an amount of more than about 2 weight percent, based on the total weight of the composition. Most desirably, the hydroxyl-functional component may be present in an amount of more than about 3 weight percent, based on the total weight of the composition. In some embodiments, the hydroxyl-functional component may be present in an amount of from about 0 weight percent to about 50 weight percent, preferably from about 0.1-20% by weight, and most preferably from about 0.5-8% by weight, based on the total weight of the composition.

F. Halogen-Free Flame Retardant

The halogen-free flame retardant agent may be selected from a group consisting of nitrogen-containing compound-based flame retardants, graphite material-based flame retardants, melamine cyanurate-based flame retardants, metal hydroxide-based flame retardants, metal oxide-based flame retardants, metal phosphate-based flame retardants, metal borate-based flame retardants, and organophosphate-based flame retardants. Suitable examples include but not limited to MPP (melamine polyphosphate), $Mg(OH)_2$, $Al(OH)_3$, zinc borate, APP (ammonium polyphosphate), DMMP (dimethyl methylphosphonate), TPP (triphenyl phosphate), zinc phosphate, MCA (melamine cyanurate), MP (melamine phosphate), DOPO (9,10-Dihydro-9-oxa-10-phosphaphenanthrene 10-oxide), etc.

Phosphorus-based flame retardant agents have high flame retardant efficiencies, which are desirably used in the present invention. Hydrous metal compounds are preferably selected to use with phosphorus containing salt together because of the good synergy effect thereof with phosphorus compounds and the good thermal conductivity. Examples of hydrous metal compounds include $Al(OH)_3$, $Mg(OH)_2$, etc.

Examples of organophosphorus-based flame retardants include but not limited to organophosphates and organophosphorus salts. For example, an organophosphorus salt, OP935 commercially available from Clariant Chemicals Company, China with high phosphor content, 23-24 wt %, in solid filler type, was used.

In order to avoid a decrease in the bond strength of the adhesive that can be caused by filler type flame retardants, the present inventors found that several different types of flame retardants could be added together. The great synergy between different types of flame retardants was unexpectedly achieved and fully utilized to decrease the usage volume and get high bond strength.

In some embodiments, a metal hydroxide flame retardant material is preferably selected to be used with phosphorus salt because it provides good synergy effects with phosphorus compounds and further provides good thermal conductivity. $Mg(OH)_2$, $Al(OH)_3$, preferably $Al(OH)_3$, for example, ATH commercially available from Xusen Company, China can be used.

In some embodiments, metal borate and/or metal phosphate flame retardant material, such as zinc borate or zinc phosphate is added because of the good synergy thereof with OP935 and ATH. Zinc borate is preferably used. Zinc borate is available from, for example, Xusen Company, China.

In some embodiments, organophosphate flame retardant material, such as P30 available from Chengzaicheng Company, China, a liquid flame retardant polymer, mixture of triphenyl phosphate (CAS: 115-86-6) with aromatic phosphate ester, phosphorus content of 8-9% wt, is added to increase the tackiness property of the adhesive composition without causing a loss of flame retardance.

In some other embodiments, a flame retardant, OP935, powder material of organophosphorus salt, with phosphorus content of 23-24% wt, particle size of D95<10 μm, density of 1.2 $g/cm^3$, decomposition temperature >300° C., from Clariant Chemicals Company, India is used.

All flame retardants are added in an amount in the range of about 0-50 wt %, preferably about 0-40 wt %, more preferably about 0-30 wt %, and most preferably about 1-25 wt %, based on 100 wt % of the total weight of the composition.

G. Optional Components

The compositions and tapes of the present invention may also comprise additives such as tackifiers, antioxidants, coupling agents, thickeners, auxiliary flame retardants, antifoaming agents, pigments, surfactants, surface-modifiers and the like, in an amount of about 0-5 wt %, more preferably 0-3 wt %, even more preferably 0.1-2 wt %, and most preferably 0.2-1 wt %, based on the total weight of the composition, to provide the compositions and tapes with preferable physical properties depending on their use.

In order to obtain high bond strength, a tackifier resin was preferably used in some embodiments of the adhesive composition of the present invention. Preferred tackifiers include one or more types selected from the group consisting of Terpene Phenol Resin, Rosin ester resin and the like. Preferred tackifiers are those having different softening points, which can provide the adhesive composition with good tackiness and adhesiveness. Examples of suitable tackifiers include, but not limited to, TP2040, GAAT, GA90A, which are available from Arizona Chemical, USA, Arizona Chemical, USA and Wu Zhou Sun Shine Company, China, respectively.

Examples of coupling agents are silane coupling agents and organic titanate coupling agents. For example, A171 from Dow Corning, USA is applicable in the invention.

The composition may further comprise a solvent. The amount of the solvent may vary within a wide range. In some embodiments, the solvent may be present in an amount of up to about 70 wt %, or up to about 60 wt %, or up to about 50 wt %, or up to about 40 wt %, based on the total weight of the composition. In some embodiments, the solvent may be present in an amount of more than about 10 wt %, or more than about 20 wt %, or more than about 30 wt %, or more than about 40 wt %, based on the total weight of the composition. Examples of the solvent suitable herein include, but not limited to, ethyl acetate, toluene, xylene, alcohols such as methanol, ethanol, or isopropyl alcohol, acetone, etc.

H. Tape Structure

The present invention also provides a thermally conductive pressure-sensitive adhesive tape. The tape comprises at least one pressure-sensitive adhesive layer, and a backing layer, wherein the pressure-sensitive adhesive layer comprises a pressure sensitive adhesive composition provided by any one of embodiments of the present invention.

In one embodiment, a thermally conductive pressure-sensitive adhesive tape comprises: (i) a backing layer; and (ii) a thermally conductive pressure-sensitive adhesive layer provided on at least one side of the backing layer and comprising a pressure sensitive adhesive composition, wherein based on the total weight of the adhesive composition, the adhesive composition comprises: (a) 5-70% by weight of an epoxy component; (b) 5-60% by weight of thermally conductive material; (c) 0.001-10% by weight of a photoinitiator; (d) 0-40% by weight of a thermoplastic polymer; (e) 0-50% by weight of a hydroxyl-functional component; and (f) 0-50% by weight of a halogen-free flame retardant.

Figure 2:
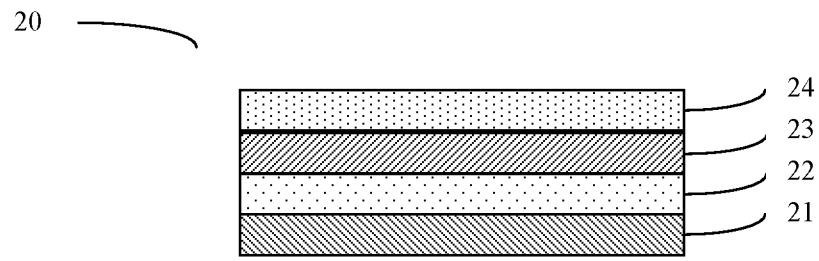
FIG. 2 is a cross-sectional view of a double coated adhesive tape in another embodiment.
Figure 3:
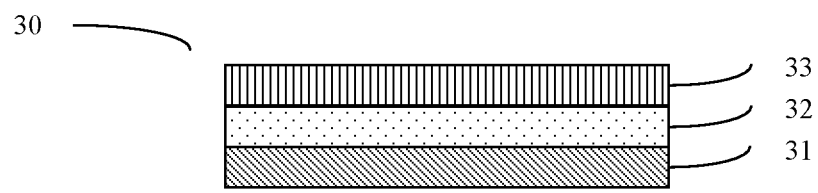
FIG. 3 is a cross-sectional view of a single coated adhesive tape in another embodiment.

The tape may have various structures, for example, double coated adhesive tape and single coated adhesive tape. FIGS. 1-3 have shown three types of structures as a reference.

FIG. 1 is a cross-section view of an adhesive film tape. The tape 10 shown in FIG. 1 comprises a backing layer 11, and a thermally conductive pressure-sensitive adhesive layer 12. The backing layer can be a release liner which can be any base material commonly used in the art. The release liner acts as a support and/or protection for the adhesive layer, and may be removed before the application of the tape.

FIG. 2 is a cross-sectional view of another adhesive tape 20 according to another embodiment. Such structure is also referred to as double coated tape in the art. The adhesive tape 20 comprises a release liner 21, a first adhesive layer 22, a backing layer 23, and a second adhesive layer 24, successively. In this embodiment, the first and second thermally conductive pressure-sensitive adhesive layers 22 and 24 are respectively disposed on one side of the backing layer 23. The backing layer 23 here mainly acts as a media to support the adhesive layers 22 and 24 and commonly are referred to as carrier in the art. The release liner 21 mainly provides protection to the first adhesive layer 22. Alternatively, there can be provided another release liner attached to the second adhesive layer 24 to prevent it from being destroyed.

FIG. 3 is a cross-sectional view of yet another adhesive tape 30 according to one embodiment of the present invention. Such structure is also referred to as single coated tape in the art. The single coated adhesive tape 30 comprises a release liner 31, an adhesive layer 32, and a backing layer 33. The adhesive layer 32 is disposed on one side of the backing layer 33, while the release liner 31 is disposed on one side of adhesive layer 32 opposite to the backing layer 33.

The adhesive layer 12, 22, 24 and 32, as mentioned above, comprises a pressure sensitive adhesive composition provided by any one of embodiments of the present invention.

In a multi-adhesive layer tape structure, such as a double coated tape structure, the composition of the adhesive layers can be the same or different.

There is no limit on the thickness of each layer. For a dry adhesive layer, without any restriction, a single layer thickness can be in a range of 0.005~0.3 mm, depending on the process capability. In one embodiment, 0.1 mm of single coated layer thickness is used.

There is no limit on the thickness of the backing layer which can be chosen according to actual application like the insulation property needed. Generally, the thickness of the backing layer can be in a range of 0.001~0.5 mm, but not restricted.

The backing layer of the tape can be any type commonly used in the art. For example, the backing layer can be respectively selected from: polyimide (PI) film, polyethylene terephthalate (PET) film, glass fibre mesh, or the like. As used herein, "carrier" has almost the same property as "backing", but carrier is commonly referred to as the backing layer used for double coated tape, and backing is commonly referred to as the backing layer used for single coated tape. The materials suitable for the carrier and backing are almost the same.

There is no limitation to the backing and carrier suitable for the present invention. Any conventional backing and carrier material used in the present field may be used in the present invention. For example, the carrier may be a release liner and/or backing material commonly known in the art, and the backing may be super thin plastic film (for example, a film with a thickness less than 50 μm, preferably less than 30 μm) such as polyimide (PI) film and thermally conductive polyethylene terephthalate (PET) film, or insulating woven or nonwoven material, such as glass fibre cloth. A cloth preferred for some embodiments of the present invention is glass cloth, such as that is commercially available from Shanghai Boshe Industry Company, China.

Production process of adhesive tape is described as follows.

The pressure-sensitive adhesive tape of the present invention can be produced according to any method conventionally employed for the production of a pressure-sensitive adhesive tape or the like. For example, it can be obtained by a solvent-based mixing and coating process or a solvent-less compounding and coating process such as UV or E-beam polymerization process. Alternatively, the pressure-sensitive adhesive composition may be coated directly on one surface or both surfaces of the backing layer, or the release liner if used to support the adhesive layer. Alternatively, a pressure-sensitive adhesive layer may be separately formed as an independent layer and then this pressure-sensitive adhesive layer may be laminated on the release liner or the backing layer. For coating the adhesive layer, a commonly employed method such as solvent-based coating and solvent-less coating may be used. The surface of the backing layer is preferably subjected to a primer treatment prior to the coating or laminating step so as to improve the adhesion of pressure-sensitive adhesive layer to the backing layer. In place of or in addition to the primer treatment, other pretreatments may be applied. Such a pretreatment can be performed with or without a reactive chemical adhesion promoter such as hydroxyethyl acrylate or hydroxyethyl methacrylate, or other reactive species of low molecular weight. The backing layer is composed of a polymer film and therefore, corona discharge treatment is generally preferred. The pressure-sensitive adhesive tape of the present invention is expected to have the above-described excellent balance of various properties and therefore, can be advantageously applied to various adherends including from soft to hard articles. Furthermore, an adhesive structure having excellent properties and the like can be provided. For example, the thermally conductive pressure-sensitive adhesive tape of the present invention can be advantageously used in many technical fields, including but not limited to, power supplies, LED (light-emitting diode), automotive, electronics, motors, telecom, semiconductors, HHM (hand held machine) products, etc.

The method to make the adhesive tape will be briefly explained below as a reference.

The sequence of adding and mixing components in a solvent-based process is not specifically limited. In one embodiment, all components are mixed in a solvent with a high shear agitator to obtain a homogeneous adhesive mixture. Preferably, the photoinitiator ingredient is added finally, after all the other components are totally dissolved or dispersed and a homogeneous mixture is obtained. The composition will be mixed under lucifugal environment, and kept in dark environment, especially kept out of sun. The solvent is optional for the process, which depends on the viscosity of the adhesive system. Solvent is used to assist easily coating but is not a necessary component in the invented composition. The mixture is degassed by a vacuum pump under reduced pressure, and then is coated on a release liner or backing layer to form the adhesive tape product. More than one adhesive layer may be coated, for example, a second adhesive layer can be successively coated on the backing layer as above shown in FIG. 2 to form an adhesive tape with two adhesive layers. The coating is preferably to be made under lucifugal environment, and the finished products are kept in dark environment, especially kept out of sun.

The following examples and comparative examples were provided to aid in the understanding of the present invention and are not to be construed as limiting the scope thereof.

Unless otherwise indicated, all parts and percentages are by weight. The following test methods and protocols were employed in the evaluation of the illustrative and comparative examples that follow.

Materials used in the examples are summarized below.

Polymer A: LEVAPREN 800 HV, EVA, Vinyl acetate content: 80%. Mooney viscosity 100° C.: 28, commercially provided by Lanxess Company, Germany.

Polymer B: M029, commercially available from Eternal Chemical Company, Acrylic polymer, IV>1.0, solid 30%

Polymer C: YD128, from Kukdo Chemical (Kunshan) Co. Ltd, China, epoxy equivalent weight ca. 187, liquid at room temperature and atmospheric pressure Polymer D: VORANOL 2070, from Dow Company, USA, polyether triol, molecular weight 700

Resin: GA90A, from Wu zhou Sun shine Company, China, Rosin ester, soft point: 85~95° C.

Photoinitiator: Cationic Photoinitiator 1190, from IGM Resins, China, a mixture of triarylsulfonium hexafluorophosphate salts Cross linker: aromatic bisamide compound, RD-1054, from 3M Company, USA, used as a 5% weight xylene solution.

Flame retardant A: P30, from Chengzaicheng Company, China, liquid type flame retardant agent, mixture of Triphenyl phosphate (CAS: 115-86-6) with aromatic phosphate ester, Phosphorus content, 8~9% wt Solvent: Ethyl Acetate Coupling agent: A171, from Dow Corning, USA Thermally conductive material A: CF200, from Yingkou Pengda Chemical Material Company, China, BN powder, mean particle size 8~15 µm; Surface Area, 3~5 m$^2$/g, Tap Density, 0.35 g/cc, <25% 4.45 µm, <50% 7.3 µm, <75% 10.5 µm, <90% 13.4 µm.

Thermally conductive material B: ATH, from Suzhou Ruifeng Material company, China, Mean particle size 5~10 µm; D10/D90: 1/15 µm Flame retardant B: OP935, from Clariant Chemicals Company, India, organophosphorus salt, Phosphorus content, 23~24% wt, particle size, D95<10 µm, Density 1.2 g/cm$^3$, decomposition temperature>300° C.

EXAMPLES

Examples 1-9 and Comparative Example 1 as shown in Table 1 were prepared and evaluated.

Example 1

Process

Components as described in Table 1 are used.

First, the epoxy component, EVA, VORANOL 2070 Polyol, flame retardant material A, Cationic Photoinitiator 1190 and the first part of the solvent were combined in a plastic bottle. The resulting mixture was stirred at room temperature until a homogeneous mixture was obtained, obtaining a polymer adhesive mixture.

And then, the thermally conductive filler A and flame retardant material B were added to a mixture of the second part of the solvent and coupling agent, stirred for about 30 min at room temperature until a homogeneous slurry was obtained. The sum of the first part and the second part of the solvent was as specified in Table 1. The slurry was added into the above polymer adhesive mixture batchwise and stirred for about 30 min at room temperature until a substantially homogeneous adhesive mixture was obtained. The final adhesive mixture had a solid content of 40%. Then the mixed adhesive composition was coated on a release liner and then passed through an oven with 4 heating zones of temperatures set at 40° C., 80° C., 110° C., and 120° C. with each heating zone 4~6 m in length, to be dried and produce an ATT (Adhesive Transfer Tape) product. The above adhesive composition was double coated on a PI film to form a tape product for the test.

Examples 2-9

The composition preparation and sample preparation of Examples 2-9 were the same as that in Example 1, except that the components and ratios as shown in Table 1 were used. Comparative Example 1 is prepared by using the ingredients as shown in Table 1.

Test Method and Data

Bond Strength Cleavage:

Tensile test equipment (Instron 5565, available from Instron Corp.) was used. Aluminum test blocks (1 inch×1 inch) were wiped with isopropanol.

The assemblies were prepared by removing one of the protective liners from the tape measuring 1 inch×1 inch (2.54 cm×2.54 cm) as prepared according to the general preparations of adhesive sheets. The exposed adhesive surface was then irradiated with an amount of UVA radiation emitted from a UV lamp available as Fusion UV Curing System (Fusion UV Systems, Inc., Gaithersburg, Md.) equipped with a D-bulb. The amount of energy used to irradiate the adhesive surface was measured using a UVI MAP. UV and Temperature Measuring/Plotting System, Model UM365H-S (Electronic Instrumentation Technology Inc., Sterling, Va.) designated to measure UV-A radiation in the range of 320-390 nm. Immediately after the UV irradiation process, the tape was attached on the Aluminum block surface (1 inch×1 inch area) by hand with light thumb pressure.

The second liner of the tape was removed, and irradiated with same amount of UVA radiation, and then the second Aluminum block surface (1 inch×1 inch area) was overlapped on the exposed adhesive surface immediately after the irradiation. The assembled blocks that hold one layer sample in middle was pressed by Instron with a pressure 2000 N±100 N, pressing time maintained for 20 s. Then test samples assembled were allowed to cure in an oven at 85° C. for 30 minutes and then allowed to cool at 23° C. for about 1 hour before testing. The sample could also be cured at 23° C. for 1 day (i.e., without heating) before testing.

Cleavage test was performed at 23° C. on the cured assemblies prepared as described above by the Instron apparatus. Instron jigs fixed on the block holders, clamp two end of the block and pull/cleave the two holders by Instron at a speed of 50.8 mm/min. The test was repeated three times for each sample and the average values are recorded in Table 2.

Thermal Conductivity:

Each of the prepared composition adhesive film was cut into a wafer with diameter 30 mm, and thermal conductivity of the samples was measured with a thermally conductive meter DRL-II (Xiangtan Yiqiyibiao Company, China) according to the test standard GB 5598-85. Test data are showed in Table 2.

Flame Retardancy Test:

According to the UL-94 (Standards established by U.S. Underwriters' Laboratories Inc.) vertical burning test, a flame was placed under the sample for 10 seconds and then removed, and the time taken for the sample to stop burning was measured. After the sample stopped burning, the flame was placed again under the sample for a further 10 seconds and then removed, and the time taken for the sample to stop burning was measured. A pair of 5 samples was evaluated (the burning time was measured a total of 10 times). The maximum burning time of 10 burning times, the total of 10 burning times, and whether or not there are drips during burning were evaluated.

The rating for flame retardancy classification is given below. The other details are according to the UL-94 standards.

V-0: Maximum burning time, 10 seconds or less; total burning time, 50 seconds or less; no drips.

V-1: Maximum burning time, 30 seconds or less; total burning time, 250 seconds or less; no drips.

V-2: Maximum burning time, 30 seconds or less; total burning time, 250 seconds or less; drips permitted.

Burning: The above conditions not satisfied.

Sample preparation: each of the prepared composition adhesive was coated on a liner to form an adhesive film, and then laminated the adhesive film to make the test specimen with thickness 1.0 mm, width 12.5 mm, and length 127 mm. Test data are showed in Table 2.

Bond Strength: Torque Force (Kfg·Cm)

Instron 5565 (available from Instron Corp.) and Torque force tester 20N DPSK (available from Japan KANON Corp.) were used. Aluminum test panel (2 inch wide×6 inch long) and A1 blocks (1 cm$^2$ effective test area, 10 mm wide*10 mm long*5 mm height) were wiped with isopropanol.

The assemblies were prepared by removing one of the protective liners from the tape measuring 2 inch×5 inch as prepared according to the general preparations of adhesive sheets. The exposed adhesive surface was then irradiated with an amount of UVA radiation emitted from a UV lamp available as Fusion UV Curing System (Fusion UV Systems, Inc., Gaithersburg, Md.) equipped with a D-bulb. The amount of energy used to irradiate the adhesive surface was measured using a UVI MAP. UV and Temperature Measuring/Plotting System, Model UM365H-S (Electronic Instrumentation Technology Inc., Sterling, Va.) designated to measure UV-A radiation in the range of 320-390 nm. Immediately after the UV irradiation process, the tape was attached on the Aluminum panel surface (2 inch×5 inch area), preferably by using a roll or scraping tool to avoid bubble occur between the A1 panel and tape.

The second liner of the tape was removed, and irradiated with same amount of UVA radiation, and then the Aluminum block surface (with 100 mm$^2$ effective attach area, 10 mm wide*10 mm long*5 mm height) was overlapped on the exposed adhesive surface immediately (within 30 sec) after the irradiation, then the assembled A1 block was pressed by Instron with a pressure 2 Mpa immediately after A1 block was attached on the tape (preferably within 10 sec), pressing time maintained for 5 sec. Then test samples assembled were allowed to cure in an oven at 85° C. for 30 minutes and then allowed to cool at 23° C. for about 1 hour before testing. The samples could also be cured at 23° C. for 24 hour (i.e., without heating) before testing.

Torque test was performed at 23° C. on the cured assemblies prepared as described above steps. Torque force tester fixed on the A1 block, twist the A1 block by the torque tester clockwise until the A1 block was quickly de-bonded from the tape. The test data was displayed on the tester dial. The test was repeated three times for each sample and the average values are recorded in Table 2.

Results

As can be seen from Table 2, the adhesive tapes of the present invention could offer a satisfactory performance combination in torque force (>10 Kgf·cm), high thermal conductivity (>0.60 W/m·k) and high cleavage adhesion (>1.0 MPa), as compared with the tape of Comparative Example 1.

TABLE 1

Formulations for Examples 1-9 and Comparative Example 1

| Ingredients | E1 | E2 | E3 | E4 | E5 | E6 | E7 | E8 | E9 | C1 |
|---|---|---|---|---|---|---|---|---|---|---|
| Polymer A | 4.25 | 0.00 | 9.87 | 0.00 | 16.54 | 4.03 | 0.00 | 5.72 | 0.00 | 0.00 |
| Polymer B | 0.00 | 0.00 | 0.00 | 0.00 | 0.00 | 0.00 | 0.00 | 0.00 | 0.00 | 33.11 |
| Polymer C | 12.76 | 31.65 | 14.81 | 18.03 | 8.27 | 15.36 | 24.58 | 11.44 | 15.22 | 0.00 |
| Polymer D | 1.08 | 0.00 | 0.83 | 0.00 | 1.40 | 1.30 | 0.00 | 0.97 | 0.76 | 0.00 |
| Resin | 0.00 | 0.00 | 0.00 | 0.00 | 0.00 | 0.00 | 0.00 | 0.00 | 0.00 | 3.31 |
| Photoinitiator | 0.59 | 1.10 | 0.46 | 0.84 | 0.77 | 0.55 | 1.15 | 0.53 | 0.60 | 0.00 |
| Crosslinker | 0.00 | 0.00 | 0.00 | 0.00 | 0.00 | 0.00 | 0.00 | 0.00 | 0.00 | 0.53 |
| Flame Retardant A | 1.93 | 0.00 | 0.00 | 1.90 | 1.55 | 2.12 | 0.00 | 2.10 | 1.93 | 2.22 |
| Solvent | 59.32 | 55.13 | 58.85 | 59.13 | 55.34 | 56.19 | 57.80 | 59.13 | 61.52 | 39.72 |
| Coupling Agent | 0.20 | 0.12 | 0.15 | 0.20 | 0.16 | 0.25 | 0.23 | 0.20 | 0.20 | 0.25 |
| Thermally Conductive Material A | 11.92 | 12.00 | 15.03 | 12.40 | 9.58 | 9.51 | 16.24 | 11.93 | 12.12 | 12.25 |
| Thermally Conductive Material B | 0.00 | 0.00 | 0.00 | 0.00 | 0.00 | 4.25 | 0.00 | 0.00 | 0.00 | 0.00 |
| Flame Retardant B | 7.95 | 0.00 | 0.00 | 7.50 | 6.39 | 6.44 | 0.00 | 7.98 | 7.65 | 8.61 |
| Total | 100.00 | 100.00 | 100.00 | 100.00 | 100.00 | 100.00 | 100.00 | 100.00 | 100.00 | 100.00 |

TABLE 2

Test results of Examples 1-9 and Comparative Example 1

| | E1 | E2 | E3 | E4 | E5 | E6 | E7 | E8 | E9 | C1 |
|---|---|---|---|---|---|---|---|---|---|---|
| Flame Retardancy (UL94) | V0 | Flammable | Flammable | V0 | V0 | V0 | Flammable | V0 | V0 | V0 |
| Thermally Conductivity (W/mk) | 0.70 | 0.72 | 0.76 | 0.73 | 0.68 | 0.73 | 0.80 | 0.74 | 0.73 | 0.72 |
| Torque Force (Kgf · cm) | 19.50 | 28.00 | 21.00 | 23.40 | 10.20 | 16.00 | 15.00 | 18.00 | 26.30 | 4.01 |
| Cleavage Adhesion (MPa) | 1.40 | 2.30 | 1.73 | 1.70 | 0.81 | 1.60 | 1.50 | 1.78 | 2.20 | 0.50 |

We claim:

1. A thermally conductive adhesive composition, based on the total weight of the composition, comprising:
   (a) 15-45% by weight of an epoxy component;
   (b) 20-40% by weight of electrically insulating, thermally conductive material;
   (c) 0.5-4% by weight of a photoinitiator;
   (d) 5-25% by weight of a thermoplastic polymer;
   (e) 1-5% by weight of a hydroxyl-functional component; and
   (f) 1-25% by weight of a halogen-free flame retardant.

2. The adhesive composition of claim 1, wherein the epoxy component comprises one or more epoxy resins and/or monomers.

3. The adhesive composition of claim 1, wherein the thermally conductive material is one or more selected from ceramics, metal oxides, metal nitrides, metal hydroxides, BN, SiC, AlN, $Al_2O_3$, $Si_3N_4$.

4. The adhesive composition of claim 1, wherein the thermally conductive material has a thermal conductivity of 100 W/m·k or more.

5. The adhesive composition of claim 3, wherein the metal hydroxides are selected from a group consisting of aluminum hydroxide, alkali metal hydroxides and alkaline earth metal hydroxides.

6. The thermally conductive adhesive composition of claim 1, wherein the photoinitiator is one or more selected from photoinitiators including α-amino ketones group, photoinitiators including benzyl ketals group, photoinitiators including benzophenones group, aryl iodonium salts type photoinitiators, aryl sulfonium salts type photoinitiators, alkyl sulfonium salts type photoinitiators, iron aromatic salt type photoinitiators, and acylation sulfonylurea oxygen radical ketones.

7. The adhesive composition of claim 1, wherein the photoinitiator comprises a mixture of triarylsulfonium hexafluorophosphate salts.

8. The adhesive composition of claim 1, wherein the thermoplastic polymer comprises one of an ethylene vinyl acetate copolymer component, an acrylic polymer resin, or an epoxy modified acrylic polymer resin.

9. The adhesive composition of claim 8, wherein the ethylene vinyl acetate copolymer component comprises one or more kinds of ethylene vinyl acetate copolymers.

10. The adhesive composition of claim 1, wherein the hydroxyl-functional component comprises one or more hydroxyl-containing compounds having a hydroxyl functionality of at least one.

11. The adhesive composition of claim 1, wherein the halogen-free flame retardant is selected from a group consisting of metal oxides, hydrous metal compounds, phosphorus containing compounds, ammonium polyphosphates, metal borates and graphite materials.

12. The thermally conductive adhesive composition of claim 1, further comprising 0-5% by weight of an additive, wherein the additive is one or more selected from tackifiers, antioxidants, coupling agents, thickeners, auxiliary flame retardant agents, antifoaming agents, pigments, surfactants, and surface-modifiers.

* * * * *